July 12, 1932.  B. A. LUNDY  1,867,015
TUBE TESTING DEVICE
Filed Jan. 15, 1929
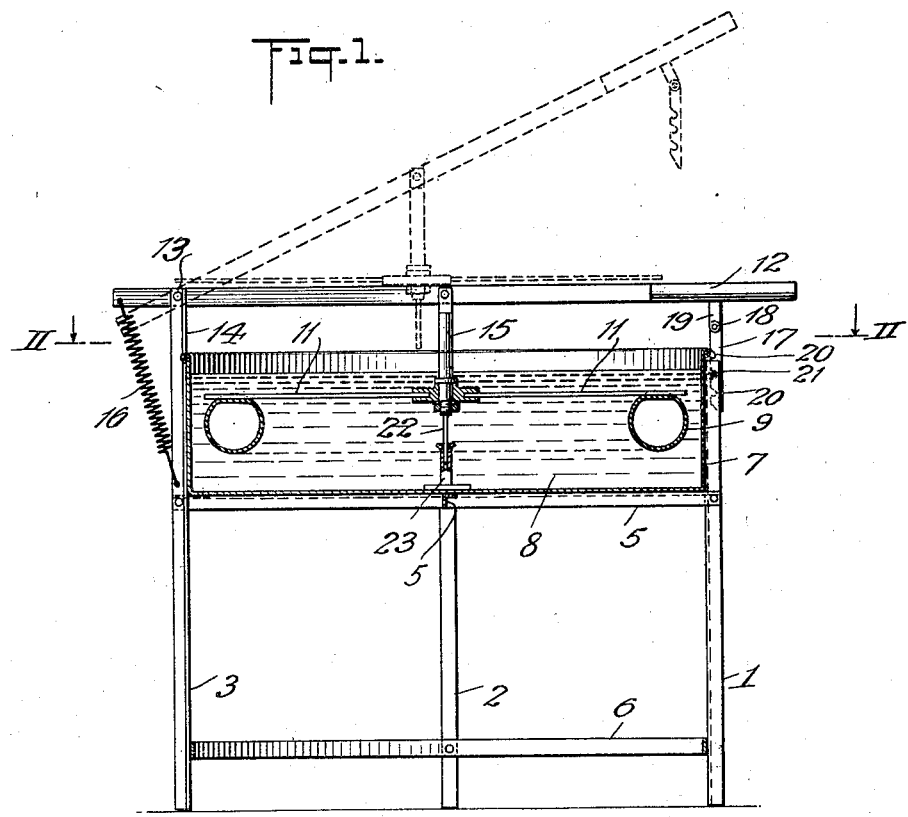
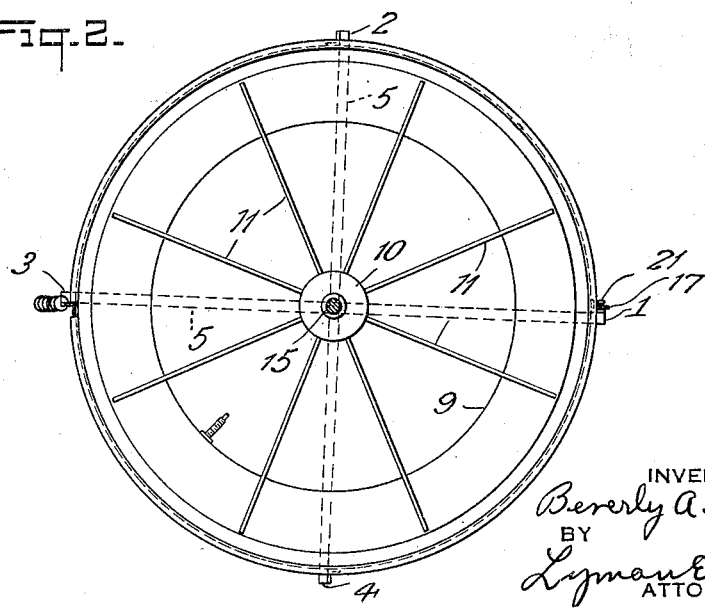
INVENTOR
Beverly A. Lundy
BY
Lyman E. Dodge
ATTORNEY Patented July 12, 1932

1,867,015

UNITED STATES PATENT OFFICE

BEVERLY A. LUNDY, OF LARCHMONT, NEW YORK

TUBE TESTING DEVICE

Application filed January 15, 1929. Serial No. 332,617.

This invention relates to inner tubes of pneumatic vehicle tires and more especially to the testing thereof for the purpose of ascertaining their air-tightness.

Those familiar with the art of pneumatic tires are well aware that under various conditions such tires have to be tested for airtightness. This is quite often done by inflating the tire and then while holding the tire in substantially a vertical plane pushing a portion thereof down below the surface of a body of water and then slowly rotating the inflated tire in the vertical plane about an imaginary axis at right angles to the plane of the tire always keeping some portion of the tire submerged. If the inflated tire is not airtight air will issue therefrom and will appear as bubbles in the water. There is some difficulty with this method, however, due to the fact that adhering air almost always rises to the surface of the water and gives the appearance of air escaping from the interior of the tire. In order to be certain that the bubbles appearing are caused by adhering air and not from air coming from the interior of the tire it is customary and necessary to hold each portion of the tire under the surface of the water for such a length of time that all of the adhering air will have ample opportunity to escape and then to hold the tire in the same position for some slight time longer. Such manipulation causes, especially in the case of very large tires, a very considerable time and is physically very tiring.

A principal object of applicant's invention is to provide a device whereby an inflated tire may be entirely and completely submerged at once and then be held submerged until such time as all adhering air has had ample opportunity to escape so that any further bubbles which may appear must of necessity be caused by air escaping from the inside of the tire.

Other objects and advantages will appear as the description of the particular physical embodiment selected to illustrate this invention progresses and the novel features of the invention will be particularly pointed out in the appended claim.

In describing the invention in detail, and the particular physical embodiment selected to illustrate the invention, reference is had to the accompanying drawing wherein has been illustrated a particular preferred physical embodiment of the invention and wherein like characters of reference designate corresponding parts throughout the several views, and in which:

Figure 1 is a side elevational view, partly in section, of a device embodying the invention; Fig. 2 is a sectional view of the device as illustrated by Fig. 1, taken on the plane indicated by the line II—II of Fig. 1, viewed in the direction of the arrows at the ends of the line.

The essential elements of applicant's invention are, first, a confined body of fluid sufficiently extensive in depth and having dimensions to receive the largest sized tire to be tested and to allow the same to be completely submerged; second, means for holding the tire in the submerged position of such a nature that the tire may be rotated.

In the drawing applicant has illustrated a convenient device for accomplishing his purposes. The particular device selected as shown is composed of a stand or frame structure of angle iron. This iron frame, in the form shown, is composed of legs 1, 2, 3 and 4 placed in a vertical position.

The legs are connected and rigidly held together by ring 6 and two cross members 5. Ring 6 is positioned adjacent to the lower ends of the legs, the cross members 5 are positioned to support receptacle 7 and are rigidly attached to legs 1, 2, 3 and 4.

The receptacle 7 of substantially cylindrical form is positioned between the legs and is supported by cross members 5. This vessel 7 in vertical dimension is such that a body of fluid may be placed therein of such depth that the largest sized tire to be manipulated may be received within the vessel and be completely submerged.

Within the vessel 7 is shown a body of fluid 8 preferably water. Within this fluid is illustrated a tire 9 lying in a horizontal plane and completely submerged.

In order to completely submerge the tire 9 applicant provides, preferably, a hub like structure 10 with radiating arms 11. By forcing the arms 11 down against the tire 9 it may be forced down into the fluid 8 and completely submerged.

In order to conveniently manipulate the arms 11 and hub 10 applicant provides manually operable arm 12 pivoted at 13 to an extension 14 of the leg 3. This arm 12 by means of link 15 is connected to the hub 10. By manual pressure applied to the arm 12 the link 15 may be caused to descend carrying with it the hub 10 and the arms 11 guided in descent by pin 22 and pin receptacle 23 attached to the bottom of receptacle 7. The arms 11 bearing against the tire 9 will cause the same to be submerged beneath the body of fluid 8 in the container or receptacle 7.

As a convenience applicant has provided a tension spring attached to the left hand end of the arm 12 beyond the pivot 13. This spring 16 causes the arm 12 carrying with it the link 15 the hub 10 and the arms 11 to be raised to the dotted line position as shown by Fig. 1 when downward pressure is not being manually applied to the arm 12. This spring 16 consequently moves the above mentioned parts out of the way so that an operator can the more easily and conveniently place an inflated tire as 9 upon the surface of the water 8 in the container 7 without being obliged to hold the arm 12 up out of the way.

As a further convenience applicant has provided a latch 17 pivoted at 18 to a slight downward extension 19 of the handle 12. This latch 17 has latching notches 20 which are engageable with a latch pin 21 fixed to leg 1. This latch enables the operator to submerge a tire by means of handle 12 to keep the same submerged without further manual effort by latching the handle 12 in place.

The hub 10 is freely rotatable upon link 15 so that by properly applying pressure to one of the arms 11 the hub together with arms 11 and submerged tire 9 may be rotated.

By the use of the device as hereinbefore described and as illustrated in the drawing one may completely inflate an inner tube place the same upon the surface of the water 8 and then completely submerge the same by means of the arms 11 pressing thereon all around at such a number of points that the entire inner tube must be submerged. The tire may then be held submerged without further operation by fastening the arm 12 by the latch 17. The device may then be allowed to stand such a time as will assure one that all of the air adhering to the inner tube has become detached so that if any further bubbles are seen one may rely upon their indication that there is air escaping from within the inner tube and that the inner tube is not in fact air-tight, or by rotating the hub more or less rapidly the adhering air may be quickly displaced. If then bubbles appear the particular portion of the tube at which they appear may be rotated to a position directly under the eye of the operator.

Although I have particularly described the structure of one physical embodiment of my invention and explained the operation and principle thereof, nevertheless, I desire to have it understood that the form selected is merely illustrative but does not exhaust the possible physical embodiments of the idea and means underlying my invention.

What I claim as new and desire to secure by Letters Patent of the United States, is:

In an inflated tube testing device, in combination: a receptacle; fluid in the receptacle; a vertical link; a hub mounted for rotation upon the link and provided with rigid radiating arms for contact with an inflated tube; a pin forming a projection on the link below the hub; a pin receptacle for cooperation with the pin and attached to the bottom of the first mentioned receptacle and substantially central thereof; an arm pivoted to the receptacle and to which the upper end of the link is pivotally attached whereby the link, hub and radiating arms may be lifted so that a completely inflated tube may be slid sidewise onto the fluid and then a depression of the pivoted arm will cause the radiating arms to force the tube under the surface of the fluid and then the hub, arms and tube may be rotated to different positions.

BEVERLY A. LUNDY.